United States Patent

Miller

[15] 3,680,545

[45] Aug. 1, 1972

[54] ELECTRO-MECHANICAL READER FOR INTERPRETING THE NEUROLOGICAL QUOTIENT OF A SUBJECT

[72] Inventor: Richard H. Miller, Berwyn, Pa.

[73] Assignee: Trimil Corporation, Ambler, Pa.

[22] Filed: April 9, 1969

[21] Appl. No.: 815,282

[52] U.S. Cl. .................... 128/2 N, 35/22 R, 273/1 E
[51] Int. Cl. ............................................. A61b 5/16
[58] Field of Search ....... 128/2 N, 2 R; 35/22, 36, 37; 273/1 E

[56] References Cited

UNITED STATES PATENTS

| | | | |
|---|---|---|---|
| 2,958,956 | 11/1960 | Olalainty | 35/22 |
| 3,029,526 | 4/1962 | Olalainty | 35/22 |
| 3,171,215 | 3/1965 | Glass et al. | 273/1 X |
| 3,357,115 | 12/1967 | Kelley | 35/22 |
| 3,423,851 | 1/1969 | Olalainty | 35/37 |
| 3,488,053 | 1/1970 | Patel | 128/2 X |

FOREIGN PATENTS OR APPLICATIONS

| | | | |
|---|---|---|---|
| 565,008 | 11/1923 | France | 128/2 |
| 365,906 | 12/1922 | Germany | 128/2 |

*Primary Examiner*—Kyle L. Howell
*Attorney*—Synnestvedt and Lechner

[57] ABSTRACT

A low inertia, high sensitivity apparatus for sensing and recording variations in the direction of motion thereof and for registering an indication of the variation in direction to thereby serve as a measure of the degree of motor control ability of a subject, the apparatus having a follower including make-and-break electrical circuitry to record positive indications of deviations in direction which exceed a predetermined value.

1 Claim, 7 Drawing Figures

INVENTOR.
RICHARD H. MILLER
BY
Lynnestvedt & Lechner
ATTORNEYS

INVENTOR.
RICHARD H. MILLER
BY
ATTORNEYS

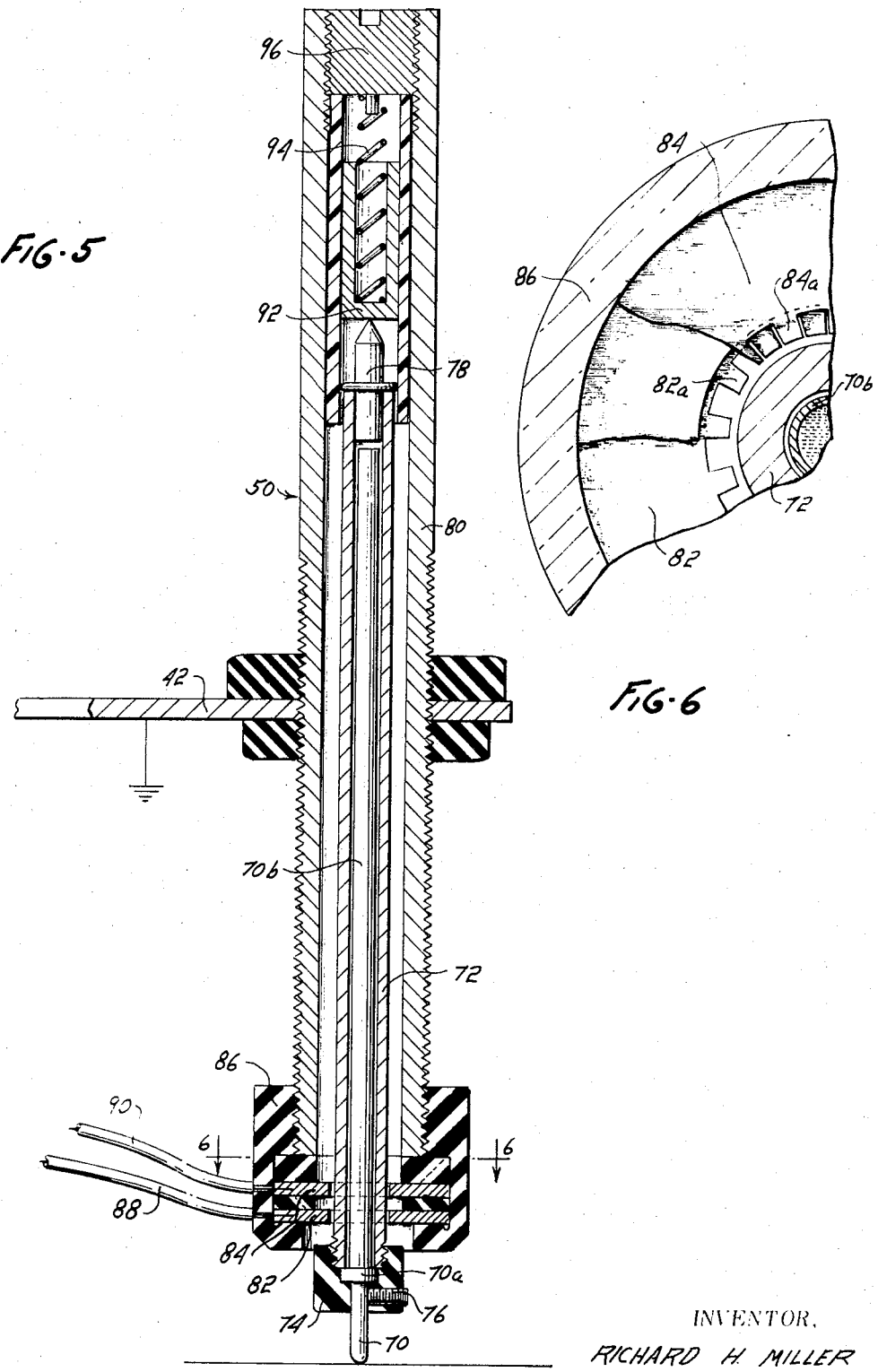

ELECTRO-MECHANICAL READER FOR INTERPRETING THE NEUROLOGICAL QUOTIENT OF A SUBJECT

This invention relates to an apparatus for use in evaluating various characteristics of a trace of a subject undergoing neurological tests. In the past, attempts have been made to establish a correlation relating trace characteristics and motor nerve conditions; however, prior to the development of the subject apparatus, the theories upon which these attempts were predicated remained mere suppositions.

These prior attempts were centered around a device which employed an electro-mechanical sensing member in the form of a stylus which traveled across a printed circuit sensing pattern consisting of alternating long and short bars adjacent to the locus of the normal test pattern. It was the intent of this early device to provide a numerical measure of both approximate line length and deviation from the normal test pattern. Because of threshold problems in which a very small increase in deviation could greatly influence the quantitative results, the initial approach using the printed circuit board, was abandoned in favor of an XY table implemented to actuate counters to read equivalent line length.

In addition to an inherent error of up to 41 percent, the use of the XY table was rejected when it became known that the XY measurement alone was unrelated to other meaningful criteria for measuring the neurological quotient.

The present apparatus is believed to be the first operative embodiment of a device capable of quantitatively measuring a significant number of trace characteristics of a subject so as to enable a value to be assigned to the degree of motor nerve control the subject has with respect to his body functions.

Although of primary concern to persons afflicted with disorders to the motor nerve center of the brain, other possible applications make readily apparent the broader implications of the subject apparatus. For example, it is contemplated for use as a means for periodically testing pilots to detect an early breakdown in their motor control ability. More basic applications of the subject apparatus include: Multiple schlerosis, cerebral palsy and Parkinson's disease. Other, equally intriguing applications include the diagnosis of children's diseases in which the child cannot read; as an assist in medical exams for employees; as a means for the detection of poisons including chlorine; as a means of checking eyes for eyeglass fitting, and in evaluating other neurological disorders where digital tremor is a prominent sympton.

In addition to the above diagnostic uses, the subject apparatus is of particular value in recording the progress of a disease. This latter facility is afforded by the high degree of consistency exhibited by both the subject and the technique under consideration. It has been found that there is a certain consistency measurable in the same subject when the latter is subjected to a series of tests on successive days. Thus, discounting an initial learning curve, a subject's abilities are more or less consistently reflected in the traces generated over an extended period of time. In the case of a subject having a neurological disease, whose condition worsens with time, these conditions will reflect themselves in the trace characteristics as measurable quantities indicative of his relative condition.

Through extensive experimentation it has been found that an operative set of trace characteristics measurable with the subject apparatus include: trace length, maximum deviation, average deviation, number of cycles, time and frequency.

The significance of the above parameters is subject to further analysis. Thus, a subject's ability doesn't initiate movements is reflected in the total time it takes to complete the trace. More specifically, as the subject attempts to follow the trace, signals are transmitted from the brain to the hands or arm structure telling it to move; however, that portion of the brain which in fact energizes the hand or arm doesnt immediately function. As a consequence there is a delay between the time the subject decides to move and the time that motion is actually initiated. This time is reflected in the total time it takes the subject to complete the trace.

Another significant parameter concerns overshoots. These overshoots are reflected in the subject apparatus in part in terms of a cycle count or frequency parameter. They occur as the subject, when following the trace and in anticipation of turning a corner on the trace pattern, signals the brain to make the proper preparations for the turn; however, there is a delay in terms of the time it takes the brain to function to initiate the action. As a consequence, the hand continues along the path but overshoots prior to the time corrective action is taken. Corrective action in turn results in a further deviation on the other side of the curve. In consequence, a hunt begins in which the subject, after a number of transitions of the trace pattern, again locks onto the curve.

Maximum deviation is another critical parameter and is particularly useful in a ratio analysis. As such it is a measure of the maximum displacement of the patient's trace relative to the trace pattern. The ratio of maximum deviation to area under the curve is particularly valuable in establishing a consistency pattern. Consistency patterns are in fact found to be a readily measurable quantity which correlate well with the other parameters. Thus, those subjects who seemingly do the best job also do it the fastest. This latter consideration enables the purposely deceptive subject to be identified.

The preferred embodiment of the subject apparatus makes use of conventional circuitry to measure and record the parameters indicated above. Thus, maximum deviation may be recorded by means of a peak voltage detector operative alone or in conjunction with a difference amplifier to record a signal proportional to the displacement of the follower from the base line. Average deviation is the total area under the curve defined by the subject trace and test pattern divided by the length of the test pattern. The length of the test pattern is a fixed quantity while the line length or length of the subject trace is a variable, readily measured by means of a conventional planimeter. The number of cycles corresponds to the number of deviations in the subject's trace as measured by the number of deviations which exceed a predetermined angular limit. Alternatively, the number of cycles may be detected by counting the number of voltage inflections in the signal representative of the displacement of the subject trace from the base line. Time is a measured quantity recorded by the administrator of the test, which together with the number of cycles, yields a measure of frequency.

The subject apparatus is concerned with means for evaluating the neurological quotient of a subject by recording characteristics including those outlined above and for translating the recorded values into a relative scale.

A further ability of the subject apparatus concerns its use as means for measuring the degree of motor control ability of a subject by analyzing an attempted trace of a standard test pattern as generated by the subject in which, in the subsequent analysis of the trace, a follower is employed to record positive indications of deviations in direction of said trace which deviations exceed a predetermined limit as well as a measure of the area under the trace, the latter being generated as a signal proportional to the displacement of the follower from the base line of the test pattern.

As such, a specific object of the present invention concerns the provision of means including a low inertia, high sensitivity apparatus to measure and precisely evaluate the degree of digital tremor of a subject such that by periodically re-examining said subject one can establish a progress report thereon.

The foregoing object and features which characterize the subject apparatus, as well as other objects of the invention, are pointed out with particularity in the claim annexed to and forming a part of the present specification. For a better understanding of the invention, its advantages and specific objects allowed with its use, reference should be made to the accompanying drawings and descriptive matter in which there is illustrated and described a preferred embodiment of the invention.

In the drawings:

FIG. 5 is a view of the stylus outlined in conjunction with the reader of FIG. 4; and, FIG. 6 is a sectional view of the stylus of FIG. 5.

Before initiating a detailed discussion of the subject apparatus and the steps involved in the use thereof, it may be helpful to review the underlying principles of the procedure involved in testing the neurological quotient or degree of motor nerve control of a subject. In this respect the test comprises an attempt by the subject to follow a test pattern. The test may be administered by a nurse or other reasonably competent person who is capable of directing the subject's efforts, although no special training need be provided. The subject is seated at a table or desk and is directed to trace the outline of the test pattern with a pen. Two test patterns are required, one for each hand. These may be embodied on a single test sheet or on separate sheets. The patient is instructed to trace each pattern from end to end, in one continuous line, to the best of his ability. The elapsed time required for completion of each trace is recorded by the nurse.

After the test has been administered and the necessary supplemental information obtained concerning the identity of the subject, the test sheets are ready for analysis. The analysis is performed on the reader referred to above and described in more detail below.

Although in the preferred embodiment manual means are afforded for "reading" the subjects trace, it should be obvious that such manual techniques introduce a degree of operator error. More sophisticated techniques contemplated include an electronic scanning device to eliminate operator error.

Figure 1:
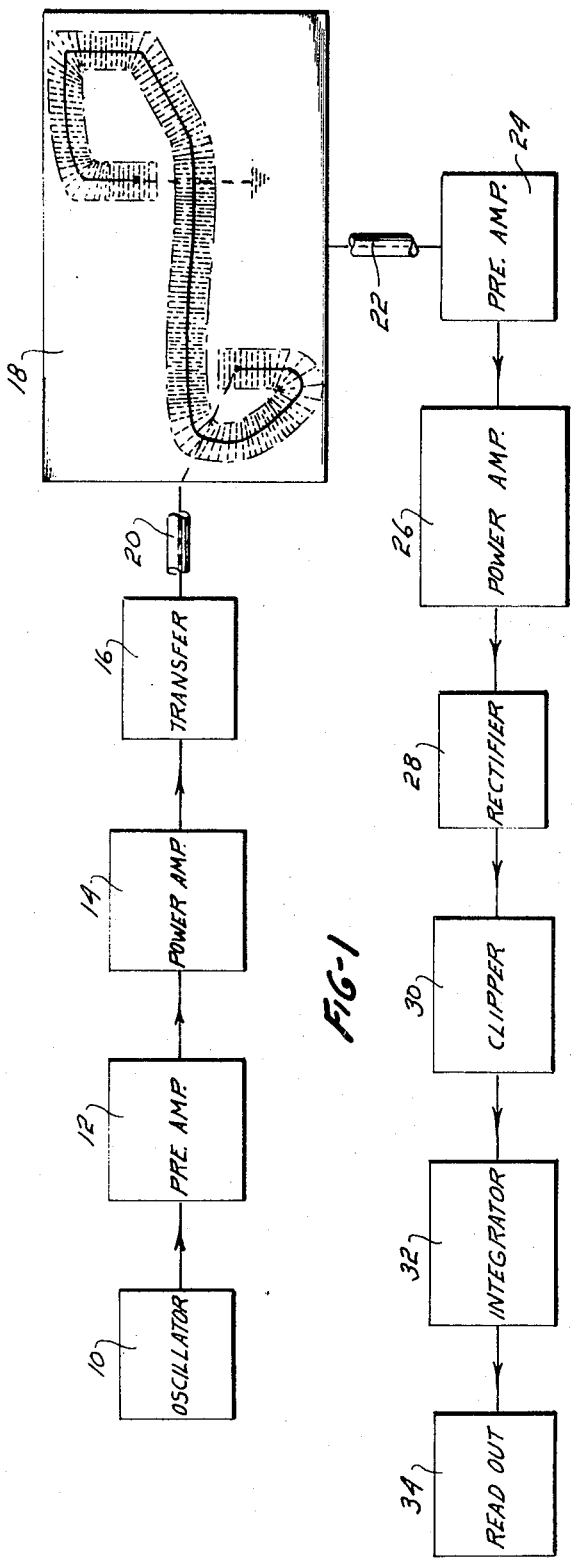
FIG. 1 is a block diagrammatic representation of the area reader portion of the subject apparatus.

Turning now to the drawings, FIG. 1 discloses in diagrammatical fashion, the implementation of the area reader as used in the preferred embodiment of the present invention. The manner in which the present invention operates to read out the trace characteristics is to set up an electric analogue of the test pattern by applying a field generating signal applied directly to an electrically conductive path having the configuration of the test pattern. The field strength of the applied signal diminishes proportionately to the displacement from the base line of said test pattern. Mechanical linkage is provided to connect the "reading" stylus to a follower and to position the latter on the corresponding point of the electrical analogue of the test pattern. The follower is in turn connected to a high impedance pickup which senses the electric field strength at each point of contact.

In one embodiment of the subject invention it is contemplated that the field generating signal will be applied directly to the test sheet by attaching electrodes directly to the electrically conductive path defining the test pattern thereby precluding the necessity of an electrical analogue of the test pattern and the associated follower as utilized in the preferred embodiment of the present invention. It has been found however that less rigid control procedures need be practiced with the preferred embodiment of the present invention in which mechanical coupling is provided to enable the displacement of the subjects trace from the base line of the test pattern to be translated on a one for one basis to the high impedance follower; the latter, in assuming the same relative displacement with respect to the electrical analogue of the test pattern as is experienced by corresponding points of the test pattern, generates a voltage proportional to the displacement of the stylus and follower away from the base line of the test pattern.

The trace to be read is accurately aligned with the "-field" by means of registration marks printed on the test sheet bearing the subject's trace. A skilled person moves a carriage carrying both the stylus and follower along the subjects trace thus generating a signal proportional to the displacement from the base line as indicated above.

Figure 2:
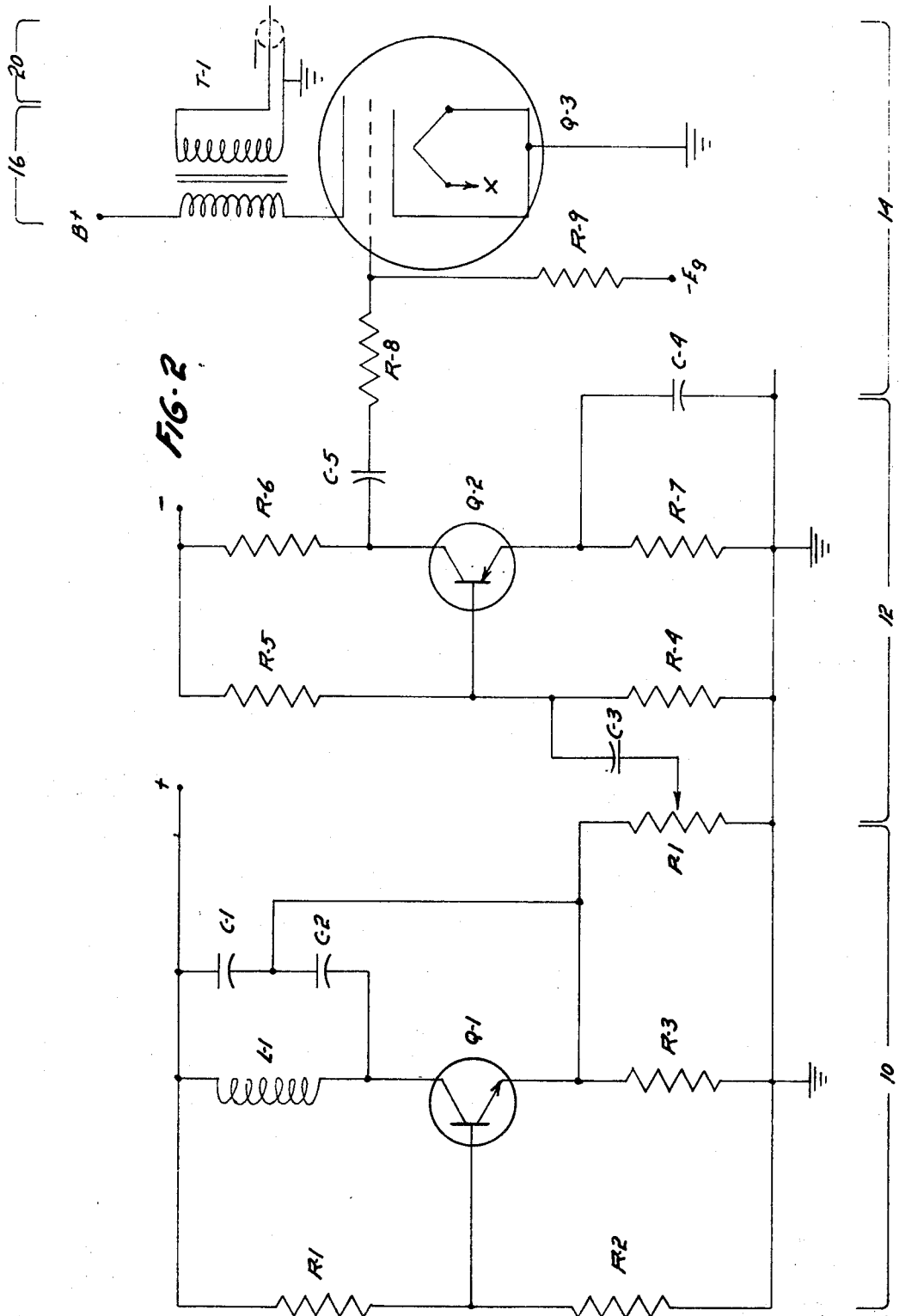
FIG. 2 is a schematic diagram of the input signal generating portion of the area reader of FIG. 1.

The oscillator 10 of FIG. 1 corresponds to the resistors R1, R2 and R3, capacitors C1 and C2, inductance L1 and transistor Q1 in the schematic of FIG. 2. The aforementioned components are combined in the indicated manner to form a conventional Colpitts oscillator. The output of the oscillator appears across the potentiometer P1 as a very stable 2 kilocycle signal.

The output of the oscillator 10 serves as an input to a pre-amplifier 12 which may take the form of a conventional single stage audio amplifier represented in the schematic of FIG. 2 as comprising resistors R4, R5, R6 and R7 together with capacitors C4, C5 and transistor Q2.

The output of the pre-amplifier 12 is capacitor coupled by member C5 to serve as an input to a second or power amplification section 14. The power amplifier may incorporate a conventional power tube Q3 to provide the high current necessary for direct coupling through a transfer stage 16 represented by transformer T1, to the low impedance load represented by the electrical analogue of the test pattern 18. The input signal to the test pattern 18 is established by way of the shielded cable 20 which is directly connected to the electrical conductive path, equivalent to the base line of the test pattern.

In the operation of the input circuit of the area reader, the 2 kilocycle signal, after the indicated amplification, is applied along the base line of the electrical analogue of the test pattern thus setting up an electric field in the immediate vicinity thereof. In the preferred embodiment the amplified input signal is on the order of 2 volts which is applied to the approximate 20 ohm load represented by the electrical analogue of the test pattern. The voltage gradient on either side of the base line is sufficiently well defined such that a probe positioned a reasonable distance from the base line will sense a voltage proportional to the displacement therefrom. In this manner an operator of the reader has but to guide the probe along the path defined by the patient's attempt to follow the base line, in order to generate the information necessary to describe the area under the curve.

In order to make the subject area reader independent insofar as possible of non-uniform sweep motion due to pauses, or whatever, of the person "reading" the trace, means have been included in the present invention whereby the electrical analogue of the test pattern is divided into alternate conductive and insulative segments so that the follower connected to the output circuitry described below, will alternately make and break connections to the electric field thus facilitating the transmission of successive increments of information.

Figure 1A:
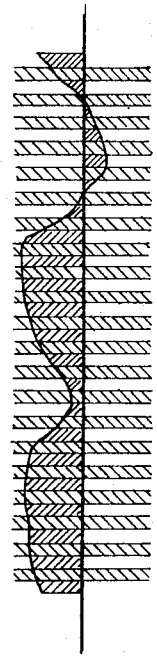
FIG. 1A is an enlarged view of the electrical analogue of the test pattern disclosed in FIG. 1.

FIG. 1A discloses an enlarged view of a portion of the electrical analogue of the test pattern. The uniformly cross hatched segments represent the insulative portions of the electrical analogue which alternate with the conductive portions. Superimposed on the enlarged section is a corresponding portion of a subject's trace. Shown in contrasting cross section on the portion of the conductive sections is the area encompassed by the base line and the subject trace. It is the function of the area reader to generate as a digital output a measure of the area under the curve.

Referring once more to FIG. 1, the means for interpreting the information supplied to the area reader by the patient's trace includes a stylus, described more completely with respect to FIGS. 5 and 6, and indicated generally as the shielded member 22. In addition to serving as a high impedance pickup for the area reader portion of the subject invention, the stylus, as will become apparent below, is of such design that it facilitates a cycle count of the subject trace.

Figure 3:
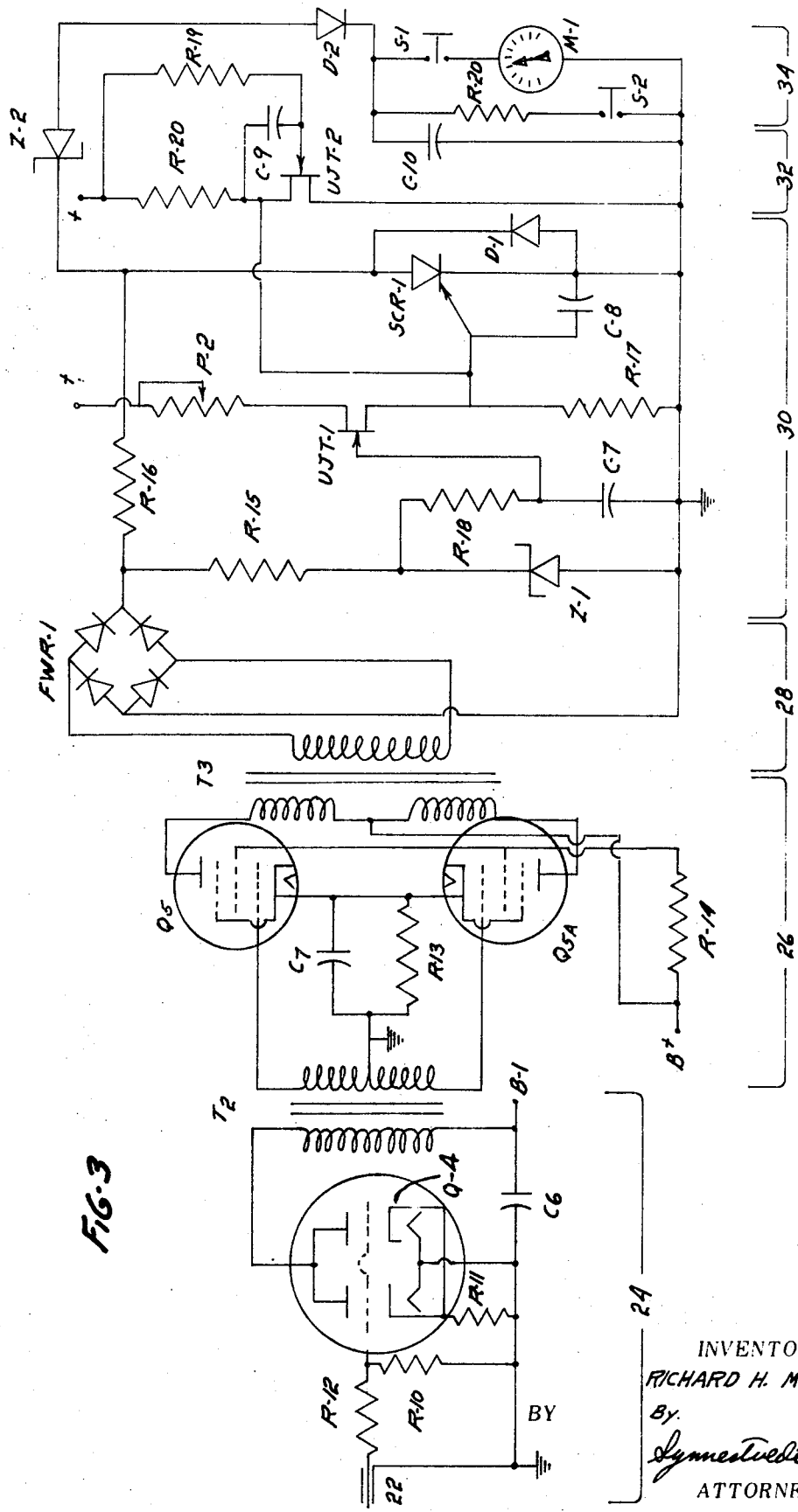
FIG. 3 is a schematic diagram of the output portion of the area reader disclosed in FIG. 1.

The low voltage output of the stylus is first amplified in member 24 which may take the form of an audio frequency amplifier stage in the nature of that disclosed in FIG. 3 and which comprises a transformer T2, tube Q4, capacitor C6, and resistors R10, R11, R12.

The output of the amplifier 24 is transformer coupled via transformer T2 to form the input to a power amplifier 26 comprising vacuum tubes Q5 and Q5A connected in a conventional push-pull sense. The output of the power amplifier 26 is coupled via an isolation transformer T3 to a full wave rectifier 28 further identified in FIG. 3 as member FWR1.

The output of the rectifier circuit 28 in turn serves as an input to a clipping circuit 30 comprising resistance members R15, R16, R17, and R18, capacitors C7 and C8, Zener diode Z1, diode D1, unijunction transistor UJT1 and a silicon controlled rectifier SCR1. Unijunction transistor UJT2 in combination with resistors R19 and R20 as well as capacitor C9 function to supplement the firing of the unijunction transistor UJT1 and thus serve as a clipper boost circuit. The firing cycle of the unijunction transistor UJT2 is nominally less than that of unijunction transistor UJT1 thus enabling the former to serve as a relaxation oscillator for the purpose of supplying negative pulses to the base of the unijunction transistor UJT1 sufficient to enable the latter to fire and thereby in turn control the firing of the silicon controlled rectifier SCR1.

The firing of the silicon controlled rectifier SCR1 in turn serves to "sample" the input signal at a rate determined by the firing rate of the clipping circuit. The output of the clipping circuit is accumulated incrementally in integrator 32, which in the schematic of FIG. 3 comprises capacitor C10 and diode D2. A measure of the signal accumulated in the integrator 32 is available for readout on the meter M1 which is selectively energized by means of switch S1. As indicated above, the charge accumulated on the capacitor C10 is proportional to the area under the curve defined by the patient trace and base line. A switch S2 is provided to "reset" the sampling circuit by discharging capacitor C10.

The system thus far described has the disadvantage of missing those portions of the trace which fall within the insulation segment. This deficiency is obviated by providing a second electrical analogue of the test pattern in which the alternating conductive and insulative segments bear an inverse relationship with respect to corresponding sections in the first electrical analogue of the test pattern. It should thus be obvious that cumulatively, the read-out of the area under the curve will very nearly equal that of the trace itself. It follows that increased accuracy can be achieved by making the width of the conductive and insulative segments smaller and smaller.

Figure 4:
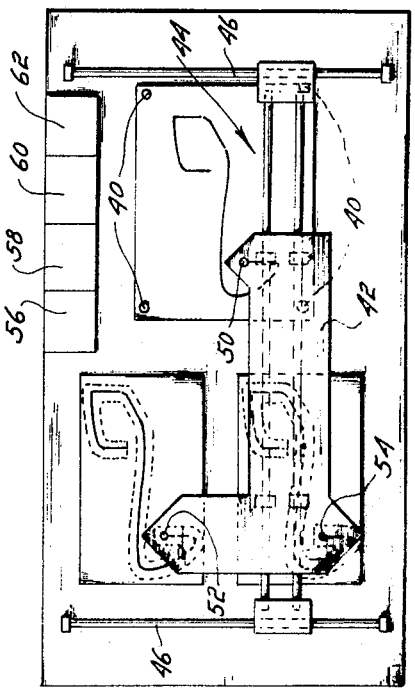
FIG. 4 is a view of the reader comprising the subject apparatus and in particular disclosing mechanical details thereof.

Reference is now made to FIG. 4 which represents a simplified view of the reader for evaluating a subject's trace. To the right side of the reader, means are provided to accommodate the test pattern bearing the trace of the subject being tested. Registration means, illustrated in the form of pins 40 are provided to insure accurate positioning of the test pattern and prevent creeping of the test pattern during the analysis.

To the left side of the reader are positioned the two electrical analogues of the test pattern, these being in the nature of member 18 of FIG. 1 as hereintofore described.

Cooperatively positioned with respect to the test pattern and the two electrical analogues thereof is a freely movable carriage 42 mounted upon rails 44 to facilitate movement of the carriage 42 in a first direction the later in turn being mounted upon rails 46 to facilitate the movement in a direction transverse to the first direction. The cooperative action afford by the carriage 42 and the rails 44 and 46 is such as to enable the carriage 42 to be universally positioned within the plane of the drawing.

Attached to the carriage 42 at a point proximate to the test pattern is a stylus 50 mentioned above as serving in the dual capacity of a follower for tracing the subject's trace as well as a means for sensing the number of cycles of the trace and providing a count thereof. The subject stylus is analyzed in more detail with respect to FIGS. 5 and 6 below.

Also fixedly mounted with respect to the carriage 42 are two high resistance, low force level followers 52 and 54 mounted in relationship to the electrical analogue of the test patterns in such manner that exact registration is provided between corresponding points on the test pattern and the electrical analogues thereof.

A bank of four counters 56-62 is provided in the upper right hand portion of the subject reader as depicted in FIG. 4 to provide a visual indication of trace characteristics measured during the course of a test analysis. Each of the counters is of conventional design. The counter 56 registers the number of cycles occurring in a subject's trace as detected by cycle counting means in the form of a make-break switch associated with the stylus 50 and described more fully below. The counter 58 comprises a peak reading voltmeter which registers a numeric indication of the maximum deviation sensed during the scanning of a subject's trace. Counter 60 is connected to a planimeter associated with the carriage 42 in juxtaposition with the stylus 50, so as to indicate the path length of the subject's trace. Counter 62 indicates the number of cycles as recorded by the variation detector associated with the followers 52 and 54, and affords a check on the cycle count registered in counter 56.

Reference is now made to FIG. 5 which discloses the stylus used in conjunction with the carriage 42 to follow the subject's trace of the test pattern. As indicated above, the stylus 50 in addition to serving to visually indicate the "reader's" progress in following the path of the subject's trace, further provides pickup means for sensing the number of cycles in the subject's trace. For this purpose a conventional ball point pen insert 70 is positioned with an electrically conductive inner housing 72 and held there by means of a retaining end piece 74 provided with a securing set screw 76.

The ball point pen refill element 70 is rigidly positioned within the housing 72 by drawing the shoulder 70A of the refill element snugly up against the cooperating end of the housing 72 and locking it there by way of a set screw 76.

The other end of the housing 72 is blocked by a plug 78 having a specially configured end piece projecting away from the housing 72, the function of which is described in detail below. Both the housing 72 and the plug 78 are of a stainless steel composition in the preferred embodiment of the present invention; however, other electrically conductive compositions such as silver and gold plate would serve equally as well.

The inner housing 72 is positioned within an outer housing 80 in a manner which permits the inner housing to "float" within said outer housing within the relatively close tolerance limits afforded by inwardly projecting contact members 82 and 84 associated with an insulated bushing 86 screwed onto the lower extremity of the housing 80. The clearance provided between the contact members 82 and 84 and the inner housing 72 is on the order of one one-thousandth of an inch although in the drawing this distance has been exaggerated in order to show that such separation actually does occur.

As seen from the sectioned view of FIG. 6, taken along the line A—A of FIG. 5, the contact members 82 and 84 represent toothed gear frames, the toothed projections of which, represented in FIG. 6 as 82A and 84A, are asymmetrically aligned. The contact members 82 and 84 serve as make and break contacts for actuating a counting relay associated with the counter 56 of FIG. 4 by means of the insulated leads 88 and 90.

It should be readily apparent from the nature of the above outlined stylus structure that as the "reader" follows the path of the subject's trace, the deviations in direction introduced by the subject will be translated into deviations in the dwell point of the inner housing 72 on one or another of the toothed projections 82A and 84A of the corresponding contact members. These deviations in direction will result in the conditioning of the counting relay as the inner housing 72 successively passes from make to break to make etc. contacts with the contact members 82 and 84 thus affording a source of signals to the counting relay associated with the counter 56 to thereby register a cycle count of the subject's trace.

Relatively high electrical sensitivity is maintained in the subject stylus at no expense to the stability of the element by means of the relatively close tolerances mentioned above. In addition the indicated configuration of the plug 78 provides a relatively low friction point which is in turn freely pivotable on a silicon-bronze plunger 92 which is biased against the plug by means of a compression spring 94 which in turn works against a threaded end plug 96 fitted in the upper portion of the outer housing 80.

The combination of the compression spring 94 pushing against the silicon-bronze plunger 92 affords a biasing force exerted against the low friction bearing surface of the plug 78 thereby permitting the latter in combination with the inner housing 72 to freely contact various ones of the toothed projections of the upper and lower contact members 82 and 84 in response to variations in direction imparted to the stylus by the operator reading the subject's trace. Contact of a "break" toothed projection completes a cycle of the make-and-break relay counter circuit thereby increasing by one the count registered on the counter 56 of FIG. 4. The electrical circuit for energizing said make-and-break relay is completed alternately through leads 88 or 90, contacts 82 or 84, the inner housing 72, plug 78, plunger 92, spring 94, end plug 96 and outer housing 80 to ground via a portion of the carriage 42. If desired means may be provided in association with the test sheet registration portion of the reader to complete the circuit through the inner housing 72 and the ball point pen element 70.

If desired the electrical circuit elements comprising the make-break switching portion of the stylus 50 as well as the high impedance pickup portion thereof may be incorporated into one or the other, or portions into both of the low force level followers 52 and 54 mounted in relationship to the electrical analogue of the test pattern. In such an embodiment, the means for following the subject's trace would simply take the form of a conventional ball point pen mounted on the low inertia drive carriage 42.

It should be obvious from the foregoing explanation that the output of the reader appears in the form of a cumulative voltage signal proportional to the sum of the incremental displacements as measured from the base line to the subject trace. It will be obvious to those skilled in the art that the direct summation of these increments will give the absolute area under the trace and that a reading of the maximum voltage recorded on the peak reading voltmeter 58 of FIG. 4, will provide a measure of the maximum deviation. Once the proportional electric voltage signal has been established it is a simple matter to develop other equally significant parameters.

Although the preferred embodiment of the present invention has been described it should be obvious to those skilled in the art that additional refinements may be introduced. As an example, a constant speed drive might be provided to eliminate the need for the second field as well as the clipping circuit. Readings would then be generated in the form of a continuously increasing signal instead of in the stepped signal afforded with the present embodiment.

It is also contemplated that the operator could be replaced by an electro-optical scanning technique which would replace the mechanical linkage and the present necessity of having an electrical analogue of the test pattern. Such a semi-automatic reader would provide obvious advantages over the preferred embodiment and yet operate on the same basic principle.

It will be apparent from the foregoing description that there has been provided an apparatus and technique for evaluating the neurological quotient of a subject. Although in the preferred embodiment, the inventive principles have been developed in an apparatus which embodies a dual representation of the test pattern which a subject is asked to trace, it should be readily apparent that other more sophisticated techniques may be contemplated for use in connection with the invention. In addition, the invention may have applicability to areas other than the primary interest of measuring disorder of the motor nerve control area of the brain. Thus the invention could supplement standard testing practices to measure the overall motor control abilities of a subject; such tests being in the nature of those which are incorporated into the measurement of the IQ and physical aptitude of a subject.

In the implementation of the present invention the values of the parameters generated from a subject's trace are manually compared with values representative of a "normal" subject. As a result of this comparison the subject under consideration is assigned a classification indicative of his neurological quotient. Periodic readministrrtion of the tests enables the subject's condition to be closely monitored.

As an alternative to the manual comparison operation indicated above, the values measured by the subject reader may be fed directly into a general purpose data processing apparatus, properly equipped with linear programs or other existing software, to directly reduce the values of the parameters of the subject's trace into an evaluation of the subject's condition.

While in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A low inertia, high sensitivity apparatus for sensing and recording variations in the direction of motion, comprising an elongated member at least a portion of which is electrically conductive, means responsive to forces to alter the direction of motion of said elongated member, at least two contact rings axially juxtaposed with respect to each other and with respect to said elongated member, a plurality of toothed projections on each of said contact rings respective ones of which are asymmetrically aligned with respect to each other, said electrically conductive portion of said elongated member being effective in contacting first one and then another of said toothed projections whenever an external force applied to said apparatus is sufficient to urge said elongated member in a significantly different direction, and means for recording the electrical signals generated upon successive contacts to thereby register an indication of the variation in direction of said apparatus.

* * * * *